United States Patent
Mori et al.

(10) Patent No.: US 10,746,675 B2
(45) Date of Patent: Aug. 18, 2020

(54) IMAGE PROCESSING DEVICE, ANALYSIS DEVICE, AND IMAGE PROCESSING METHOD FOR GENERATING AN X-RAY SPECTRUM

(71) Applicant: JEOL Ltd., Tokyo (JP)

(72) Inventors: Norihisa Mori, Tokyo (JP); Naoki Katoh, Tokyo (JP); Masaki Morita, Tokyo (JP)

(73) Assignee: JEOL Ltd., Tokyo (JP)

( * ) Notice: Subject to any disclaimer, the term of this patent is extended or adjusted under 35 U.S.C. 154(b) by 32 days.

(21) Appl. No.: 16/048,540

(22) Filed: Jul. 30, 2018

(65) Prior Publication Data
US 2019/0041343 A1 Feb. 7, 2019

(30) Foreign Application Priority Data
Jul. 31, 2017 (JP) .................................. 2017-147700

(51) Int. Cl.
*G06T 11/20* (2006.01)
*G01N 23/2209* (2018.01)
*G01N 23/2252* (2018.01)

(52) U.S. Cl.
CPC ..... *G01N 23/2209* (2018.02); *G01N 23/2252* (2013.01); *G06T 11/206* (2013.01)

(58) Field of Classification Search
None
See application file for complete search history.

(56) References Cited

U.S. PATENT DOCUMENTS

| 5,114,815 | A   | * | 5/1992  | Oda ...................... C09B 47/073 430/59.5 |
| 6,292,532 | B1  | * | 9/2001  | Kawahara ............ G01N 23/223 378/45 |
| 2004/0099805 | A1 | * | 5/2004 | Ochiai ............... G01N 23/2251 250/311 |
| 2009/0052620 | A1 | * | 2/2009 | Takakura ........... G01N 23/2252 378/45 |
| 2010/0030488 | A1 | * | 2/2010 | Statham ............ G01N 23/2252 702/28 |
| 2010/0193696 | A1 | * | 8/2010 | Blevis ..................... G01T 1/249 250/370.08 |
| 2010/0292584 | A1 | * | 11/2010 | Lee ...................... A61B 5/0205 600/485 |
| 2011/0081003 | A1 | * | 4/2011 | Harding ........... G01N 23/20066 378/88 |

(Continued)

FOREIGN PATENT DOCUMENTS

JP 201143402 A 3/2011

*Primary Examiner* — Anh-Tuan V Nguyen
(74) *Attorney, Agent, or Firm* — The Webb Law Firm

(57) ABSTRACT

An image processing device includes a spectrum acquisition unit that acquires a plurality of spectra that respectively have different measurement energy ranges and energy resolutions and are acquired using an X-ray spectrometer having a plurality of dispersion elements with different spectral characteristics, a graph generation unit that sets the plurality of spectra on a single graph having an axis of an $a^{th}$ root of the energy (where $a \geq 2$) as a first axis, and an axis based on an X-ray intensity as a second axis, and a display control unit that executes control to display the graph generated by the graph generation unit on a display unit.

6 Claims, 4 Drawing Sheets

(56) References Cited

U.S. PATENT DOCUMENTS

| | | | | |
|---|---|---|---|---|
| 2013/0321802 A1* | 12/2013 | Imura | ............... | G01J 3/0297 |
| | | | | 356/306 |
| 2014/0294402 A1* | 10/2014 | Ito | ............... | H04B 10/5561 |
| | | | | 398/188 |
| 2014/0358527 A1* | 12/2014 | Jiang | ............... | G10L 19/012 |
| | | | | 704/203 |
| 2015/0032016 A1* | 1/2015 | Ghosh | ............... | A61B 5/6823 |
| | | | | 600/516 |
| 2015/0206732 A1* | 7/2015 | Sakai | ............... | G01N 23/02 |
| | | | | 378/64 |
| 2015/0223748 A1* | 8/2015 | Warrick | ............... | A61B 5/02411 |
| | | | | 600/301 |
| 2016/0141919 A1* | 5/2016 | Ohashi | ............... | B60L 53/60 |
| | | | | 320/108 |
| 2016/0258887 A1* | 9/2016 | Terashita | ............... | G01N 23/223 |
| 2017/0199131 A1* | 7/2017 | Yoshida | ............... | G01N 21/62 |

* cited by examiner

IMAGE PROCESSING DEVICE, ANALYSIS DEVICE, AND IMAGE PROCESSING METHOD FOR GENERATING AN X-RAY SPECTRUM

CROSS-REFERENCE TO RELATED APPLICATION

This application claims priority to Japanese Patent Application No. 2017-147700 filed Jul. 31, 2017, the disclosure of which is hereby incorporated in its entirety by reference.

BACKGROUND OF THE INVENTION

The present invention relates to an image processing device, an analysis device, and an image processing method.

In an electron probe micro analyzer, a specimen is irradiated with an electron beam, a characteristic X-ray generated from the specimen in response to irradiation by the electron beam is detected by an X-ray spectrometer, and a specific element contained in the specimen is analyzed qualitatively or quantitatively. A wavelength-dispersive X-ray spectrometer (WDS) and an energy-dispersive X-ray spectrometer (EDS) are known as X-ray spectrometers for detecting the characteristic X-ray.

In a wavelength-dispersive X-ray spectrometer, an X-ray of a specific wavelength is separated from the characteristic X-ray generated from the specimen and detected by a dispersion element. The wavelength-dispersive X-ray spectrometer includes a plurality of dispersion elements having different spectral characteristics, and a spectrum having a different measurement energy range and a different energy resolution is acquired by each dispersion element.

Hence, in an EPMA, a plurality of spectra respectively having different measurement energy ranges and energy resolutions are acquired by measuring a single specimen, and these spectra are displayed side by side on a single screen. However, when the plurality of spectra are simply displayed side by side, the respective spectra are not clearly visible.

In response to this problem, JP-A-2011-43402 discloses a display processing device that displays a plurality of spectra measured with respect to a single specimen and respectively having different measurement wavelength ranges (measurement energy ranges) and wavelength resolutions (energy resolutions) on a screen as a single X-ray spectrum by disposing the spectra on a single wavelength axis.

When the plurality of spectra measured with respect to a single specimen and respectively having different measurement energy ranges and energy resolutions are displayed as a single X-ray spectrum, peaks are concentrated on the low energy side due to measurement principles, and as a result, the peaks on the low energy side are not clearly visible.

Further, with respect to spectra acquired by an energy-dispersive X-ray spectrometer by detecting a characteristic X-ray generated from a specimen, peaks are likewise concentrated on the low energy side due to measurement principles, and as a result, the peaks on the low energy side are not clearly visible.

SUMMARY OF THE INVENTION

The invention is capable of provide an image processing device and an image processing method with which spectra can be displayed clearly. The invention is also capable of providing an analysis device including this image processing device.

According to a first aspect of the invention, there is provided an image processing device including:

a spectrum acquisition unit that acquires a plurality of spectra that respectively have different measurement energy ranges and energy resolutions and are acquired using an X-ray spectrometer having a plurality of dispersion elements with different spectral characteristics;

a graph generation unit that sets the plurality of spectra on a single graph having an axis of an $a^{th}$ root of the energy (where a≥2) as a first axis, and an axis based on an X-ray intensity as a second axis; and a display control unit that executes control to display the graph generated by the graph generation unit on a display unit.

According to a second aspect of the invention, there is provided an image processing device including:

a spectrum acquisition unit that acquires a spectrum that is acquired by an X-ray spectrometer by detecting a characteristic X-ray generated from a specimen;

a graph generation unit that sets the spectrum on a graph having an axis of an $a^{th}$ root of the energy (where a≥2) as a first axis, and an axis based on an X-ray intensity as a second axis; and a display control unit that executes control to display the graph generated by the graph generation unit on a display unit.

According to a third aspect of the invention, there is provided an analysis device including either of the image processing devices described above.

According to a fourth aspect of the invention, there is provided an image processing method including:

acquiring a plurality of spectra that respectively have different measurement energy ranges and energy resolutions and are acquired using an X-ray spectrometer having a plurality of dispersion elements with different spectral characteristics;

setting the plurality of spectra on a single graph having an axis of an $a^{th}$ root of the energy (where a≥2) as a first axis, and an axis based on an X-ray intensity as a second axis; and displaying the graph on a display unit.

Figure 1:
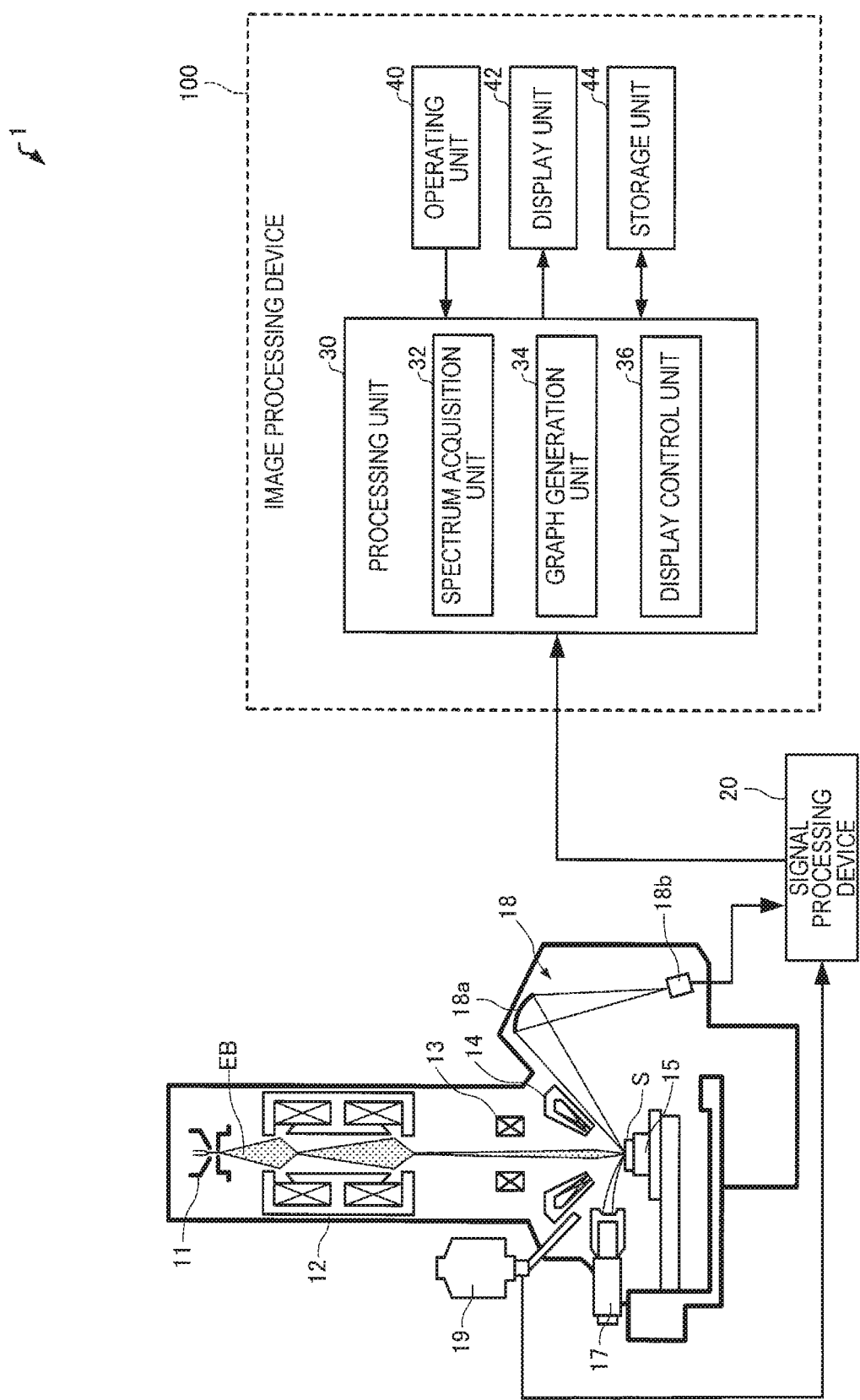
FIG. 1 is a diagram illustrating a configuration of an analysis device including an image processing device according to one embodiment of the invention.

DESCRIPTION OF THE INVENTION (1) According to one embodiment of the invention, there is provided an image processing device including:

a spectrum acquisition unit that acquires a plurality of spectra that respectively have different measurement energy ranges and energy resolutions and are acquired using an X-ray spectrometer having a plurality of dispersion elements with different spectral characteristics;

a graph generation unit that sets the plurality of spectra on a single graph having an axis of an $a^{th}$ root of the energy (where a≥2) as a first axis, and an axis based on an X-ray intensity as a second axis; and a display control unit that executes control to display the graph generated by the graph generation unit on a display unit.

According to this image processing device, on the generated graph, an energy interval increases steadily toward a low energy side, and as a result, peaks on the low energy side can be seen easily. Hence, a plurality of spectra having different measurement energy ranges and energy resolutions can be displayed clearly.

(2) In the image processing device described above, the graph generation unit may generate the graph by disposing each of the plurality of spectra on a single energy axis and converting the energy axis into an axis of the $a^{th}$ root of the energy.

(3) In the image processing device described above, when I is the X-ray intensity, A is a sensitivity coefficient of the dispersion element, and L is an L value representing a distance between an X-ray generation source and the dispersion element, the graph generation unit may set an axis of $(I \times A \times L)^{1/b}$ (where b≥2) as the second axis.

According to this image processing device, the graph generation unit sets an axis of $(I \times A \times L)^{1/b}$ as the second axis of the graph, and therefore, on the generated graph, sensitivity differences among the respective dispersion elements and sensitivity differences corresponding to the L value are corrected such that the X-ray intensities can be compared easily. Moreover, on the generated graph, very small peaks can be seen easily. Hence, with this image processing device, a plurality of spectra having different measurement energy ranges and energy resolutions can be displayed clearly.

(4) In the image processing device described above, when I is the X-ray intensity, A is a sensitivity coefficient of the dispersion element, and θ is a Bragg angle, the graph generation unit may set an axis of $(I \times A \times \sin \theta)^{1/b}$ (where b≥2) as the second axis.

According to this image processing device, the graph generation unit sets an axis of $(I \times A \times \sin \theta)^{1/b}$ as the second axis of the graph, and therefore, on the generated graph, sensitivity differences among the respective dispersion elements and sensitivity differences corresponding to sin θ are corrected such that the X-ray intensities can be compared easily. Moreover, on the generated graph, very small peaks can be seen easily. Hence, with this image processing device, a plurality of spectra having different measurement energy ranges and energy resolutions can be displayed clearly.

(5) In the image processing device described above, the graph generation unit may set an axis of a ratio of the X-ray intensity relative to the X-ray intensity of a standard specimen as the second axis.

According to this image processing device, the graph generation unit sets an axis of a ratio of the X-ray intensity relative to the X-ray intensity of a standard specimen as the second axis of the graph, and therefore, on the generated graph, the X-ray intensities can be compared easily. Moreover, on the generated graph, very small peaks can be seen easily. Hence, with this image processing device, a plurality of spectra having different measurement energy ranges and energy resolutions can be displayed clearly.

(6) According to one embodiment of the invention, there is provided an image processing device including:

a spectrum acquisition unit that acquires a spectrum that is obtained by an X-ray spectrometer by detecting a characteristic X-ray generated from a specimen;

a graph generation unit that sets the spectrum on a graph having an axis of an $a^{th}$ root of the energy (where a≥2) as a first axis, and an axis based on an X-ray intensity as a second axis; and a display control unit that executes control to display the graph generated by the graph generation unit on a display unit.

According to this image processing device, on the generated graph, the energy interval increases steadily toward the low energy side, and as a result, peaks on the low energy side can be seen easily. Hence, a spectrum can be displayed clearly.

(7) According to one embodiment of the invention, there is provided an analysis device including either of the image processing devices described above.

Since this analysis device includes the image processing device according to the invention, a plurality of spectra having different measurement energy ranges and energy resolutions can be displayed clearly.

(8) According to one embodiment of the invention, there is provided an image processing method including:

acquiring a plurality of spectra that respectively have different measurement energy ranges and energy resolutions and are acquired using an X-ray spectrometer having a plurality of dispersion elements with different spectral characteristics;

setting the plurality of spectra on a single graph having an axis of an $a^{th}$ root of the energy (where a≥2) as a first axis, and an axis based on an X-ray intensity as a second axis; and displaying the graph on a display unit.

According to this image processing method, on the generated graph, the energy interval increases steadily toward the low energy side, and as a result, peaks on the low energy side can be seen easily. Hence, with this image processing method, a plurality of spectra having different measurement energy ranges and energy resolutions can be displayed clearly.

Embodiments of the invention are described in detail below with reference to the drawings. Note that the following embodiments do not unduly limit the scope of the invention as stated in the claims. In addition, all of the elements described in connection with the following embodiments should not necessarily be taken as essential requirements of the invention.

1. IMAGE PROCESSING DEVICE

First, an image processing device according to one embodiment of the invention will be described with reference to the drawings. FIG. 1 is a diagram illustrating a configuration of an analysis device 1 including an image processing device 100 according to one embodiment of the invention.

The analysis device 1 is a device for acquiring a spectrum by irradiating a specimen S with an electron beam EB and detecting a characteristic X-ray generated from the specimen S in response to irradiation by the electron beam EB. The analysis device 1 is an electron probe micro analyzer (EPMA).

The analysis device 1 includes an electron gun 11, a condenser lens 12, a deflector 13, an objective lens 14, a specimen stage 15, a secondary electron detector 17, a wavelength-dispersive X-ray spectrometer 18, a signal processing device 20, and the image processing device 100.

The electron gun 11 generates the electron beam EB. The electron gun 11 emits the electron beam EB toward the specimen S after accelerating the electron beam EB by a predetermined accelerating voltage.

The condenser lens 12 is disposed below (on a downstream side of in terms of the electron beam EB) the electron gun 11. The condenser lens 12 is a lens for condensing the electron beam EB.

The deflector 13 is disposed below the condenser lens 12. The deflector 13 is capable of deflecting the electron beam EB.

The objective lens 14 is disposed below the deflector 13. The objective lens 14 condenses the electron beam EB and irradiates the specimen S therewith.

The specimen stage 15 is capable of supporting the specimen S. The specimen S is placed on the specimen stage 15. The specimen stage 15 includes a moving mechanism and is capable of moving the specimen S.

The secondary electron detector 17 is a detector for detecting secondary electrons emitted from the specimen S. An output signal from the secondary electron detector 17 is synchronized with a scanning signal of the electron beam EB and stored in a storage device (not shown). As a result, a secondary electron image can be acquired.

The wavelength-dispersive X-ray spectrometer 18 is configured to include a plurality of dispersion elements (analyzing crystals) 18a and an X-ray detector 18b. The wavelength-dispersive X-ray spectrometer 18 includes the plurality of dispersion elements 18a, which respectively have different spectral characteristics (in other words, a plurality of analyzing crystals respectively having different lattice spacings), so that measurement can be implemented over a wide wavelength range.

The wavelength-dispersive X-ray spectrometer 18 separates X-rays of specific wavelengths from the characteristic X-ray generated by the specimen S using Bragg reflection by the dispersion elements 18a, and detects the separated X-rays using the X-ray detector 18b. An X-ray generation source on the specimen S, the dispersion elements 18a, and the X-ray detector 18b move around a Rowland circle having a fixed radius, and the dispersion elements 18a move along a virtual straight line while maintaining a constant take-off angle. An X-ray diffracted by the dispersion element 18a enters the X-ray detector 18b, but as the dispersion element 18a moves, a Bragg angle of the X-ray varies, leading to variation in the wavelength (energy) of the detected X-ray.

An output signal from the X-ray detector 18b is subjected to predetermined processing, such as wavelength shaping and A/D conversion, in the signal processing device 20, and is then transmitted to the image processing device 100 (a processing unit 30). Spectra acquired by the wavelength-dispersive X-ray spectrometer 18 are expressed in the form of a graph having the energy of the X-ray on the horizontal axis and the X-ray intensity on the vertical axis. The wavelength-dispersive X-ray spectrometer 18 includes the plurality of dispersion elements 18a having different spectral characteristics, and therefore spectra having different measurement energy ranges and energy resolutions are acquired from the respective dispersion elements 18a.

An energy-dispersive X-ray spectrometer 19 is a spectrometer for acquiring a spectrum by dividing X-rays according to energy. The energy-dispersive X-ray spectrometer 19 detects the characteristic X-ray generated from the specimen S by irradiating the specimen S with the electron beam EB.

An output signal from the energy-dispersive X-ray spectrometer 19 is subjected to predetermined processing in the signal processing device 20 and then transmitted to the image processing device 100 (the processing unit 30). The spectrum acquired by the energy-dispersive X-ray spectrometer 19 is expressed in the form of a graph having the energy of the X-ray on the horizontal axis and the X-ray intensity on the vertical axis.

In the analysis device 1, the electron beam EB emitted from the electron gun 11 is condensed by the condenser lens 12 and the objective lens 14 and then emitted onto the specimen S. At this time, the electron beam EB is deflected by the deflector 13 so that the electron beam EB can be emitted onto the specimen S in a desired position. When the specimen S is irradiated with the electron beam EB, a characteristic X-ray is generated from the specimen S. The characteristic X-ray generated from the specimen S is diffracted by the dispersion elements 18a and detected by the X-ray detector 18b. The output signal from the X-ray detector 18b is subjected to predetermined processing in the signal processing device 20 and then transmitted to the processing unit 30 as spectrum data. The characteristic X-ray generated from the specimen S can also be detected by the energy-dispersive X-ray spectrometer 19. The output signal from the energy-dispersive X-ray spectrometer 19 is subjected to predetermined processing in the signal processing device 20 and then transmitted to the processing unit 30 as spectrum data. In the processing unit 30, a spectrum is generated on the basis of the spectrum data from the signal processing device 20.

The image processing device 100 displays the plurality of spectra acquired using the wavelength-dispersive X-ray spectrometer 18, each of which has a different measurement energy range and a different energy resolution, on a display unit 42. The image processing device 100 also displays the spectrum acquired using the energy-dispersive X-ray spectrometer 19 on the display unit 42. The image processing device 100 includes the processing unit 30, an operating unit 40, the display unit 42, and a storage unit 44.

The operating unit 40 executes processing to acquire an operating signal corresponding to an operation performed by a user and transmit the acquired operating signal to the processing unit 30. The operating unit 40 is a button, a key, a touch panel type display, a microphone, or the like, for example.

The display unit 42 displays an image generated by the processing unit 30, and functions thereof can be realized by an LCD, a CRT, or the like. The spectrum generated by the processing unit 30, for example, is displayed on the display unit 42.

The storage unit 44 stores programs, data, and so on used by the processing unit 30 to execute various types of calculation processing. The storage unit 44 is also used as a working area of the processing unit 30 to temporarily store calculation results and the like acquired by the processing unit 30 while executing various programs. Functions of the storage unit 44 can be realized by a hard disk, a RAM, or the like.

The processing unit 30 executes processing to generate a spectrum on the basis of the spectrum data from the signal processing device 20 and display the generated spectrum on the display unit 42. Functions of the processing unit 30 can be realized by having various types of processors (a CPU or the like) execute programs. The processing unit 30 includes a spectrum acquisition unit 32, a graph generation unit 34, and a display control unit 36.

The spectrum acquisition unit 32 receives the spectrum data from the signal processing device 20 and thereby acquires the plurality of spectra acquired using the wavelength-dispersive X-ray spectrometer 18, each of which has a different measurement energy range and a different energy resolution.

The graph generation unit 34 sets the plurality of spectra acquired by the spectrum acquisition unit 32 and respectively having different measurement energy ranges and energy resolutions on a single graph having an axis of the square root of the energy as a horizontal axis (a first axis) and an axis based on the X-ray intensity as a vertical axis (a second axis). Processing executed by the graph generation unit 34 will be described in detail below in the section "2. Processing".

The display control unit 36 executes control to display the graph generated by the graph generation unit 34 on the display unit 42.

2. PROCESSING

Next, the processing executed by the processing unit 30 of the image processing device 100 will be described. Here, a case in which, in the image processing device 100, a single graph is generated from a plurality of spectra acquired by measuring a single sample (a mineral sample) using the wavelength-dispersive X-ray spectrometer 18 and respectively having different measurement energy ranges and energy resolutions, and the generated graph is displayed on the display unit 42, will be described.

Figure 2:
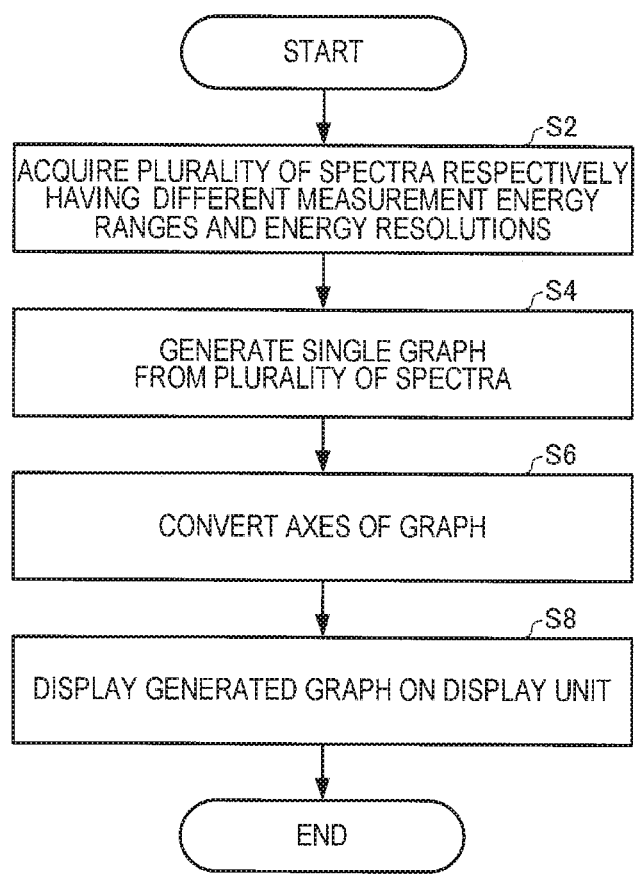
FIG. 2 is a flowchart illustrating an example of a flow of processing executed by a processing unit of the image processing device according to one embodiment of the invention.

FIG. 2 is a flowchart illustrating an example of a flow of the processing executed by the processing unit 30 of the image processing device 100.

First, the spectrum acquisition unit 32 receives the spectrum data from the signal processing device 20 and thereby acquires the plurality of spectra acquired using the wavelength-dispersive X-ray spectrometer 18, each of which has a different measurement energy range and a different energy resolution (step S2).

Figure 3:
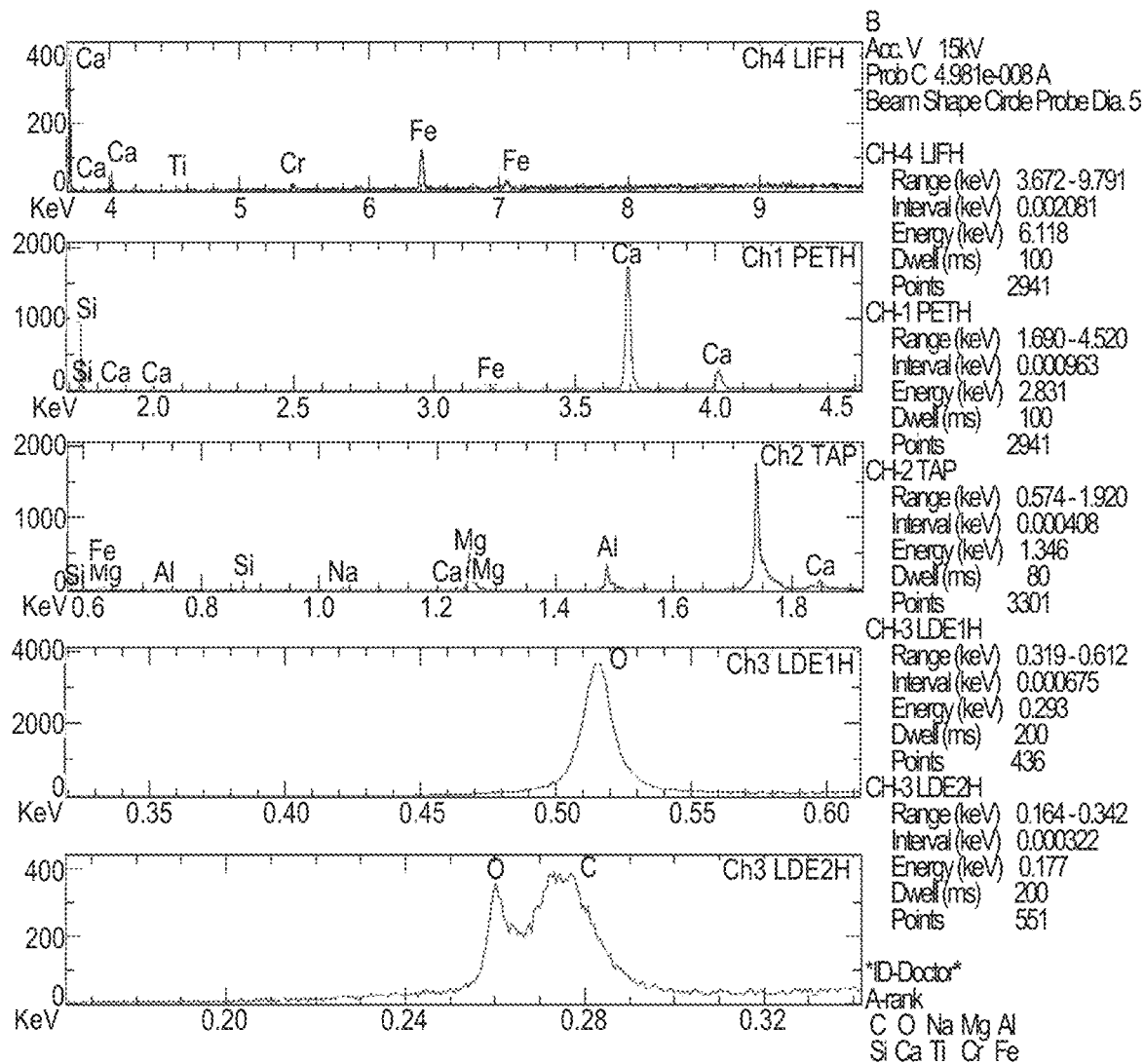
FIG. 3 illustrates an example of a plurality of spectra acquired by measuring a mineral specimen and respectively having different measurement energy ranges and energy resolutions.

FIG. 3 illustrates an example of a plurality of spectra acquired by measuring a mineral specimen and respectively having different measurement energy ranges and energy resolutions.

Here, the spectrum acquisition unit 32 acquires the five spectra illustrated in FIG. 3. The five spectra in FIG. 3 are each acquired using one of five dispersion elements 18a of the wavelength-dispersive X-ray spectrometer 18. The horizontal axis of each spectrum shows the energy of the X-ray (energy axis), and the vertical axis shows the X-ray intensity (X-ray intensity axis).

More specifically, a first spectrum of the five spectra in FIG. 3 is acquired using LIFH as the dispersion element 18a and has a measurement energy range of 3.672 keV to 9.791 keV. A second spectrum is acquired using pentaerythritol (PETH) as the dispersion element 18a and has a measurement energy range of 1.690 keV to 4.520 keV. A third spectrum is acquired using thallium acid phthate (TAP) as the dispersion element 18a and has a measurement energy range of 0.574 keV to 1.920 keV. A fourth spectrum is acquired using a layered dispersion element (LDE1H) as the dispersion element 18a and has a measurement energy range of 0.319 keV to 0.612 keV. A fifth spectrum is acquired using LDE2H as the dispersion element 18a and has a measurement energy range of 0.164 keV to 0.342 keV. Note that "H" at the end of the above analyzing crystals indicates that the analyzing crystal is a high-sensitivity crystal. Further, LDE1H and LDE2H are W/Si multilayer X-ray dispersion elements.

Next, the graph generation unit 34 generates a single graph by disposing the plurality of spectra acquired by the spectrum acquisition unit 32 on a single energy axis (step S4).

Figure 4:
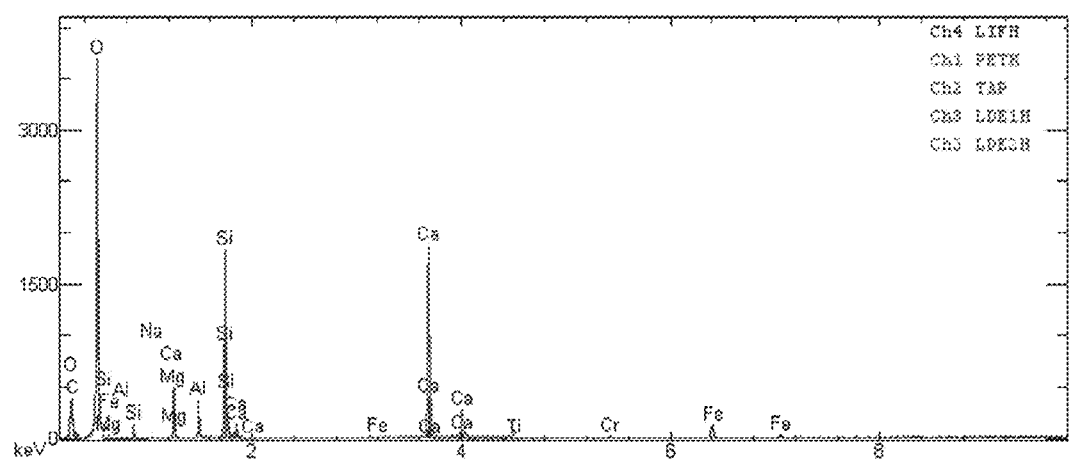
FIG. 4 is a graph on which five spectra acquired by measuring the mineral specimen are disposed on a single energy axis.

FIG. 4 is a graph on which the five spectra acquired by measuring the mineral specimen are disposed on a single energy axis.

As illustrated in FIG. 4, the graph generation unit 34 forms the single graph (spectrum) by disposing the five spectra on an energy axis that includes all of the measurement energy ranges of the five spectra. On the graph in FIG. 4, the horizontal axis is the energy axis and the vertical axis is an X-ray intensity axis.

On the graph in FIG. 4, peaks are concentrated on the low energy side, making it difficult to check the peaks on the low energy side.

Further, the five dispersion elements 18a (analyzing crystals) used to obtain the five spectra each have a different sensitivity. Therefore, on the graph in FIG. 4, simple comparisons of the magnitudes of the intensities of the peaks cannot be made between the spectra.

Moreover, in the wavelength-dispersive X-ray spectrometer 18, the sensitivity also varies according to an L value representing a distance between the X-ray generation source and the dispersion element 18a such that as the L value increases, the sensitivity decreases. Therefore, on the graph in FIG. 4, simple comparisons of the magnitudes of the intensities of the peaks (in particular, the magnitudes of the intensities of peaks having a large energy difference) cannot be made. Note that the L value is expressed by $L = 2R \sin \theta = (R/d) n \lambda$ (where R is the radius of the Rowland circle, $\theta$ is the Bragg angle, d is the lattice spacing of the analyzing crystal, n is a positive integer, and $\lambda$ is the wavelength of the X-ray).

On the graph in FIG. 4, the problems described above occur, and therefore the graph generation unit 34 converts the energy axis and the X-ray intensity axis serving respectively as the horizontal axis and the vertical axis of the graph in FIG. 4 (step S6).

Figure 5:
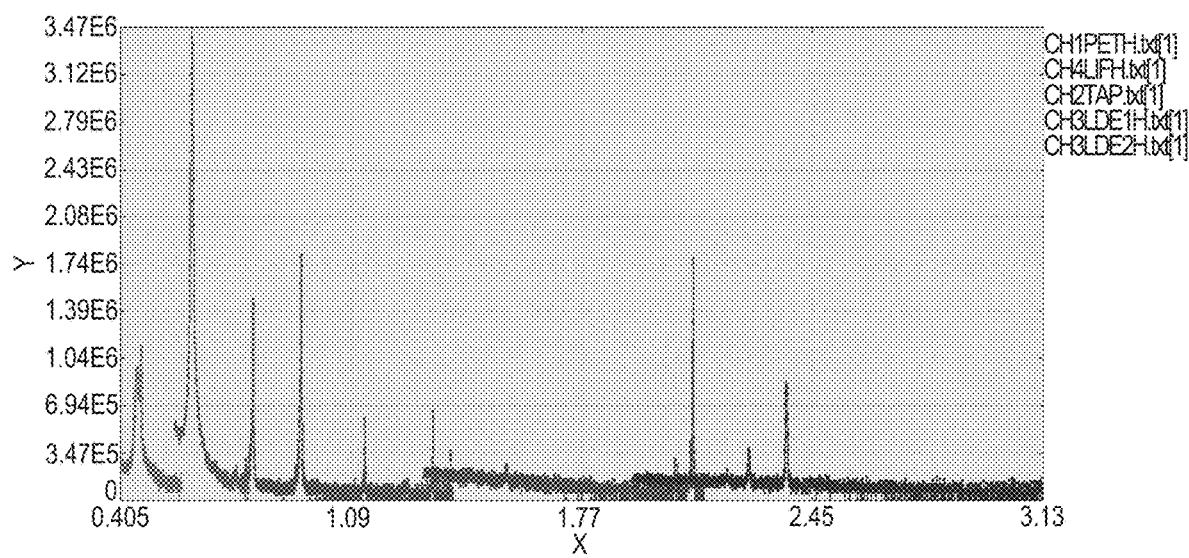
FIG. 5 is a graph generated by converting the axes of the graph illustrated in FIG. 4.

FIG. 5 is a graph generated by the graph generation unit 34 by converting the axes of the graph in FIG. 4.

The graph generation unit 34 generates a graph having an axis of the square root of the energy as a horizontal axis X and an axis corresponding to a following expression (2) as a vertical axis Y by respectively converting the horizontal axis (the energy axis) and the vertical axis (the X-ray intensity axis) of the graph in FIG. 4.

More specifically, the graph generation unit 34 converts the horizontal axis (the energy axis) of the graph in FIG. 4 using a following expression.

$$\sqrt{E} \quad (1)$$

where E is the energy of the X-ray.

Further, the graph generation unit 34 converts the vertical axis (the X-ray intensity axis) of the graph in FIG. 4 using the following expression (2).

$$\sqrt{I \times A \times L} \quad (2)$$

where I is the X-ray intensity of the characteristic X-ray, A is a sensitivity coefficient of the dispersion element, and L is the L value. Note that the sensitivity coefficient A of the dispersion element is a coefficient indicating the sensitivity of the dispersion element (the analyzing crystal), and is dependent on the type of the dispersion element (the analyzing crystal).

The graph generation unit 34 inserts the energy E of each spectrum into expression (1) and inserts the X-ray intensity I, the sensitivity coefficient A of the dispersion element 18a, and the L value into expression (2), and in so doing plots the spectra on a graph having an axis of expression (1) as the horizontal axis X and an axis of expression (2) as the vertical axis Y. In other words, coordinates (X, Y) of the graph in FIG. 5 are expressed as shown below.

$$(X,Y)=(\sqrt{E},\sqrt{I \times A \times L})$$

By setting an axis of the square root of the energy as the horizontal axis X in this manner, an energy interval increases steadily towards the low energy side, and as a result, X-ray peaks on the low energy side become more clearly visible. For example, when the horizontal axis is set as a logarithmic axis, the interval of the scale on the low energy side is much larger than the interval of the scale on the high energy side, and as a result, the spectrum as a whole becomes less clearly visible. By setting an axis of the square root of the energy as the horizontal axis, however, the energy interval on the low energy side can be increased to an appropriate degree relative to the energy interval on the high energy side, and as a result, the spectrum as a whole can be seen clearly from the low energy side to the high energy side.

Further, regarding the vertical axis Y, by multiplying the sensitivity coefficient A of the dispersion element 18a by the X-ray intensity I, intensity differences between the peaks of the spectra caused by sensitivity differences between the dispersion elements 18a (analyzing crystals) can be corrected. Furthermore, by multiplying the L value by the X-ray intensity I, intensity differences between the peaks caused by sensitivity differences corresponding to the L value can be corrected. Moreover, by acquiring the square root of the X-ray intensity I, very small peaks indicating a mass concentration of 1% or less can be seen more easily. Furthermore, an error caused by statistical variation in the X-ray intensity I is approximately the square root ($\sqrt{I}$) of the X-ray intensity. Hence, by acquiring the square root of the X-ray intensity, errors in the respective X-ray intensities can be made approximately identical, and as a result, very small peaks can be seen more easily.

As illustrated in FIG. 5, when the measurement energy ranges of two spectra having adjacent measurement energy ranges overlap, the graph generation unit 34 displays the two spectra in an overlapping state. In other words, even when two adjacent spectrum measurement energy ranges overlap, the two spectra are left as is and displayed in a superimposed fashion.

Further, the graph generation unit 34 allocates colors to each of the five spectra so as to display the five spectra in different colors. In so doing, the dispersion element 18a from which each of the five spectra is acquired can be ascertained from the graph in FIG. 5.

Furthermore, in the example in the figure, the graph generation unit 34 displays the value of the square root of the energy on the horizontal axis, but instead, an energy value may be displayed on the horizontal axis. In this case, the interval of the scale on the horizontal axis is not a regular interval, and instead, the interval of the scale is displayed so as to increase steadily as the energy value decreases.

Next, the display control unit 36 executes control to display the graph (an image) generated by the graph generation unit 34, as illustrated in FIG. 5, on the display unit 42 (step S8).

As a result, the graph in FIG. 5 can be displayed.

Note that when spectrum data (EDS spectrum data) are acquired from the mineral specimen by the energy-dispersive X-ray spectrometer 19 in addition to the spectrum data acquired by the wavelength-dispersive X-ray spectrometer 18 (WDS), as described above, the graph generation unit 34 converts the horizontal axis (the energy axis) of the EDS spectrum into an axis of the square root of the energy, and converts the vertical axis (the X-ray intensity axis) into an axis corresponding to expression (3), shown below.

$$\sqrt{I \times A_{EDS}} \qquad (3)$$

where $A_{EDS}$ is a sensitivity coefficient of the energy-dispersive X-ray spectrometer 19.

The display control unit 36 then executes control to display the EDS spectrum (the graph) having the converted axes on the display unit 42. As a result, the graph in FIG. 5 (the WDS spectrum) and the EDS spectrum can be displayed in an easily comparable fashion.

Furthermore, similar processing is executed in a case where spectrum data are acquired by an energy-dispersive X-ray detector (STEM+EDS) or an energy-dispersive X-ray fluorescence analysis device (EDXRF) installed in a transmission electron microscope in addition to the WDS spectrum data. As a result, the graph in FIG. 5 (the WDS spectrum) and a STEM+EDS spectrum or an EDXRF spectrum can be displayed in an easily comparable manner.

Moreover, in the EDS spectrum data, the STEM+EDS spectrum data, and the EDXRF spectrum data, the vertical axis (the X-ray intensity axis) may be set as an axis corresponding to expression (4), shown below, instead of an axis corresponding to expression (3).

$$\sqrt{I \times A_{EDS} \times E} \qquad (4)$$

By using expression (4), intensity differences between the peaks caused by sensitivity differences corresponding to the energy (E) of the X-ray can be corrected.

Note that a case in which five spectra are acquired from the single specimen S was described above, but there are no particular limitations on the number of spectra acquired from the single specimen S, and the number may be set as appropriate in accordance with the specimen and the aim of the analysis.

The image processing device 100, the analysis device 1, and an image processing method according to one embodiment of the invention have the following features, for example.

In the image processing device 100, the graph generation unit 34 sets the plurality of spectra having different measurement energy ranges and energy resolutions on a single graph having an axis of the square root of the energy as the horizontal axis. Therefore, on the generated graph, the energy interval increases steadily toward the low energy side, and as a result, the peaks on the low energy side can be seen easily. Hence, a plurality of spectra having different measurement energy ranges and energy resolutions can be displayed clearly.

In the image processing device 100, the graph generation unit 34 sets the axis of expression (2) as the vertical axis of the graph. As a result, on the generated graph, sensitivity differences among the dispersion elements 18a and sensitivity differences corresponding to the L value are corrected, and as a result, the intensities of the respective peaks can be compared easily. Moreover, on the generated graph, very small peaks can be seen easily.

In the image processing device 100, the graph generation unit 34 sets the EDS spectrum on a graph having an axis of the square root of the energy as the horizontal axis, and an axis based on the X-ray intensity as the vertical axis. Thus, on the generated graph, the energy interval increases steadily toward the low energy side, and therefore the peaks on the low energy side can be seen easily. As a result, the EDS spectrum can be displayed clearly.

The analysis device 1 includes the image processing device 100, and therefore a plurality of spectra having different measurement energy ranges and energy resolutions can be displayed clearly.

The image processing method according to one embodiment of the invention includes acquiring a plurality of spectra that respectively have different measurement energy ranges and energy resolutions and are acquired using the wavelength-dispersive X-ray spectrometer 18 including the plurality of dispersion elements 18a having different spectral characteristics, setting the plurality of spectra on a single graph having an axis of the square root of the energy as the horizontal axis and the axis of expression (2) as the vertical axis, and displaying the graph on the display unit 42. As a result, a plurality of spectra having different measurement energy ranges and energy resolutions can be displayed clearly.

3. MODIFIED EXAMPLES

Next, modified examples of the image processing device 100 will be described. Note that points that differ from the above example of the image processing device 100 will be described, while description of points that are similar will be omitted.

3.1. First Modified Example

First, a first modified example will be described. In the first modified example, the graph generation unit 34 differs from that of the above embodiments in that an axis corresponding to expression (5), shown below, is set as the vertical axis instead of the axis of expression (2).

$$\sqrt{I \times A \times \sin\theta} \quad (5)$$

where $\theta$ is the Bragg angle.

The L value and the Bragg angle $\theta$ have a relationship of $L=2 R \sin \theta$, and therefore, in the first modified example, similar actions and effects to those of the above embodiments can be realized.

3.2. Second Modified Example

Next, a second modified example will be described. In the second modified example, the graph generation unit 34 differs from that of the above embodiments in that an axis of a K ratio, or in other words a ratio of the X-ray intensity relative to the X-ray intensity of a standard specimen, is set as the vertical axis instead of the axis of expression (2). More specifically, in the second modified example, the plurality of spectra having different measurement energy ranges and energy resolutions are set on a single graph having an axis of the square root of the energy as the horizontal axis, and an axis of the K ratio (a ratio of the X-ray intensity relative to the X-ray intensity of a standard specimen) as the vertical axis.

For example, when the X-ray intensity of the peak having the largest X-ray intensity, among the peaks of the spectra acquired respectively by the dispersion elements 18a, is set as $I_{max}$, the K ratio of this peak is set as $K_{max}$, and the L value of this peak is set as $L_{max}$, the graph generation unit 34 determines the K ratio by inserting the X-ray intensities I of the respective spectra into expression (6), shown below.

$$\sqrt{\frac{K_{max} \times I \times L}{I_{max} \times L_{max}}} \quad (6)$$

In the second modified example, the graph generation unit 34 sets the plurality of spectra having different measurement energy ranges and energy resolutions on a single graph having an axis of the square root of the energy as the horizontal axis, and an axis of the K ratio as the vertical axis. As a result, the intensities of the respective peaks can be compared easily on the generated graph. Moreover, very small peaks can be seen easily on the generated graph.

Note that expression (7), shown below, may be used in place of expression (6).

$$\sqrt{\frac{K_{max} \times I \times \sin\theta}{I_{max} \times L_{max}}} \quad (7)$$

In this case, similar actions and effects to those obtained with expression (6) can be realized.

Further, the K ratio may be set as a mass concentration or an atomic ratio based on quantitative analysis results. Note, however, that the K ratio differs according to the type of X-ray, and therefore the X-ray intensity is preferably displayed on the vertical axis.

3.3. Third Modified Example

Next, a third modified example will be described. In the third modified example, the graph generation unit 34 differs from that of the above embodiments in that an axis of a relative intensity K (i.e. the K ratio) determined from a standard sensitivity curve is set as the vertical axis instead of the axis of expression (2). In other words, in the second modified example, the relative intensity (the K ratio) is determined using expression (6), whereas in the third modified example, the relative intensity K is determined from a standard sensitivity curve. In the third modified example, therefore, the relative intensity K (the K ratio) can be determined with greater precision than in the second modified example.

The relative intensity K is the X-ray intensity relative to the X-ray intensity of a standard specimen (the K ratio). The relative intensity K is expressed as a function of a standard sensitivity curve A (I), as shown below (K=A (I)).

The standard sensitivity curve A (I) is acquired by measuring a standard sample using the wavelength-dispersive X-ray spectrometer 18, and then measuring the X-ray intensity and the K ratio. In the image processing device 100, the standard sensitivity curve is stored in the storage unit 44. The standard sensitivity curve A (I) is expressed as shown below in expression (8), for example.

$$A(I) = \frac{I}{e^{a+b \times Z + c \times Z^2 + d \times Z^3}} \quad (8)$$

where I=cps/100 pA, Z=ln (z), and z is the average atomic number. Further, a, b, and c are constants.

The function of A (I) shown in expression (8) differs according to the type of X-ray, and therefore the type of X-ray to be used is set in advance. Note that expression (8) does not serve as a function of the L value or the Bragg angle θ, and therefore interpolation is implemented to convert A (I) into a numerical sequence corresponding to the L value and the Bragg angle. As regards the type of X-ray, the greatest versatility can be achieved by using a series of K lines, but for L line and M line peaks, a standard sensitivity curve A (I) of the L line or the M line is preferably used. Further, even more preferably, a background is removed from the qualitative analysis result so that only the vicinities of the peaks are displayed by the relative intensity K determined from the standard sensitivity curve A (I) of the corresponding X-ray type.

In the third modified example, the graph generation unit 34 sets the plurality of spectra having different measurement energy ranges and energy resolutions on a single graph having an axis of the square root of the energy as the horizontal axis, and an axis of the relative intensity K determined from a standard sensitivity curve as the vertical axis. As a result, the intensities of the respective peaks can be compared easily on the generated graph. Moreover, very small peaks can be seen easily on the generated graph.

Note that in the above description, the standard sensitivity curve A (I) is used, but when the standard sensitivity curve A (I) is not available and only a database acquired by measuring the X-ray intensity and the K ratio in each dispersion element 18a is available, the relative intensity K is determined using a fitting curve or interpolation.

3.4. Fourth Modified Example

Next, a fourth modified example will be described. In the above embodiments, an axis of the square root of the energy is used as the horizontal axis of the generated graph, but instead, a display on which the horizontal axis is an energy axis and a display on which the horizontal axis is an axis of the square root of the energy may be switched. For example, an energy axis (E) may be displayed as the horizontal axis when peaks are not concentrated on the low energy side, and an axis of the square root of the energy may be displayed as the horizontal axis when peaks are concentrated on the low energy side.

3.5. Fifth Modified Example

Next, a fifth modified example will be described. In the above embodiments, the graph generation unit 34 sets an axis of the square root of the energy as the horizontal axis, but the horizontal axis may be an axis of an $a^{th}$ root of the energy (where $a \geq 2$). In other words, the graph generation unit 34 may set the plurality of spectra on a single graph having an axis of the $a^{th}$ root of the energy (where $a \geq 2$) as the horizontal axis.

For example, the graph generation unit 34 generates the graph by disposing each of the plurality of spectra on a single energy axis and converting the energy axis into an axis of the $a^{th}$ root of the energy using expression (9), shown below.

$$\sqrt[a]{E} \tag{9}$$

Note that a is no smaller than 2, and preferably no smaller than 2 and no larger than 10 ($2 \leq a \leq 10$). The value of a may be set in advance, and can be set by a user.

According to the fifth modified example, the graph generation unit 34 sets the plurality of spectra on a single graph having an axis of the $a^{th}$ root of the energy as the horizontal axis. Thus, on the generated graph, the energy interval increases steadily towards the low energy side such that the peaks on the low energy side can be seen more easily. As a result, a plurality of spectra having different measurement energy ranges and energy resolutions can be displayed clearly.

3.6. Sixth Modified Example

Next, a sixth modified example will be described. In the above embodiments, the graph generation unit 34 sets an axis represented by expression (2) as the vertical axis, but the vertical axis may be an axis of $(I \times A \times L)^{1/b}$ (where $b \geq 2$). In other words, the graph generation unit 34 may set the plurality of spectra on a single graph having an axis of the square root of the energy as the horizontal axis, and an axis of $(I \times A \times L)^{1/b}$ (where $b \geq 2$) as the vertical axis.

For example, the graph generation unit 34 generates the single graph by disposing each of the plurality of spectra on a single energy axis and then converting the energy axis into an axis of the square root of the energy and converting the vertical axis (the X-ray intensity axis) using expression (10), shown below.

$$\sqrt[b]{I \times A \times L} \tag{10}$$

Note that b is no smaller than 2, and preferably no smaller than 2 and no larger than 10 ($2 \leq b \leq 10$). The value of b may be set in advance, and can be set by the user.

According to the sixth modified example, the graph generation unit 34 sets the intensity axis of the graph as an axis of $(I \times A \times L)^{1/b}$, and therefore, on the generated graph, sensitivity differences among the dispersion elements 18a and sensitivity differences corresponding to the L value are corrected such that the intensities of the respective peaks can be compared easily. Moreover, on the generated graph, very small peaks can be seen easily.

Note that in expressions (5), (6), and (7), square roots are used, but $b^{th}$ roots may also be used in these expressions. In other words, expression (11), shown below, may be used in place of expression (5).

$$\sqrt[b]{I \times A \times \sin\theta} \tag{11}$$

Similarly, expression (12), shown below, may be used in place of expression (6).

$$\sqrt[b]{\frac{K_{max} \times I \times L}{I_{max} \times L_{max}}} \tag{12}$$

Similarly, expression (13), shown below, may be used in place of expression (7).

$$\sqrt[b]{\frac{K_{max} \times I \times \sin\theta}{I_{max} \times L_{max}}} \qquad (13)$$

When expressions (11), (12), and (13) are used, similar actions and effects to those obtained with expressions (5), (6), and (7) can be achieved.

The invention is not limited to the above-described embodiments, and various modifications can be made within the scope of the invention.

For example, in the above embodiments, the horizontal axis is described as an energy axis, but the energy of the X-ray can also be converted into the L value, the Bragg angle $\theta$, and the wavelength $\lambda$, and it is therefore assumed that the energy axis includes axes having the L value, the Bragg angle $\theta$, and the wavelength $\lambda$ as units as well as an axis having the energy (eV) as a unit.

Further, in the above embodiments, an example in which the analysis device 1 is an electron probe micro analyzer (EPMA) was described, but as long as the analysis device according to the invention is an analysis device including an X-ray spectrometer such as a wavelength-dispersive X-ray spectrometer or an energy-dispersive X-ray spectrometer, there are no particular limitations thereon.

It should be noted that the embodiments and the modifications described above are merely examples and the invention is not limited thereto. For example, the respective embodiments and the respective modifications may be combined as appropriate.

The invention includes various other configurations which are substantially the same as the configurations described in the embodiments (for example, configurations having the same functions, methods, and results or configurations having the same objectives and effects). In addition, the invention includes various other configurations obtained by replacing nonessential portions of the configurations described in the embodiments. Furthermore, the invention includes various other configurations capable of producing the same effects or configurations capable of achieving the same objectives as the configurations described in the embodiments. Moreover, the invention includes various other configurations obtained by adding known art to the configurations described in the embodiments.

While some embodiments of the invention have been described in detail above, a person skilled in the art will readily appreciate that various modifications can be made without materially departing from the novel teachings and effects of the invention. Accordingly, all such modifications are assumed to be included in the scope of the invention.

What is claimed is:

1. An image processing device, comprising:
a spectrum acquisition processor configured to acquire a plurality of spectra that respectively have different measurement energy ranges and energy resolutions and are acquired using an X-ray spectrometer having a plurality of dispersion elements with different spectral characteristics;
a graph generation processor configured to set the plurality of spectra on a single graph having an axis of an $a^{th}$ root of the energy (where $a \geq 2$) as a first axis, and an axis based on an X-ray intensity as a second axis; and
a display control processor configured to execute control to display the graph generated by the graph generation processor on a display unit,
wherein:
when I is the X-ray intensity, A is a sensitivity coefficient of the dispersion element, and L is an L value representing a distance between an X-ray generation source and the dispersion element, the graph generation processor sets an axis of $(I \times A \times L)^{1/b}$ (where $b \geq 2$) as the second axis; or
when I is the X-ray intensity, A is a sensitivity coefficient of the dispersion element, and $\theta$ is a Bragg angle, the graph generation processor sets an axis of $(I \times A \times \sin\theta)^{1/b}$ (where $b \geq 2$) as the second axis.

2. The image processing device according to claim 1, wherein the graph generation processor is configured to generate the graph by disposing each of the plurality of spectra on a single energy axis and converting the energy axis into an axis of the $a^{th}$ root of the energy.

3. The image processing device according to claim 1, wherein the graph generation processor is configured to set an axis of a ratio of the X-ray intensity relative to the X-ray intensity of a standard specimen as the second axis.

4. An analysis device comprising the image processing device according to claim 1.

5. An image processing device, comprising:
a spectrum acquisition processor configured to acquire a spectrum that is obtained by an X-ray spectrometer by detecting a characteristic X-ray generated from a specimen;
a graph generation processor configured to set the spectrum on a graph having an axis of an $a^{th}$ root of the energy (where $a \geq 2$) as a first axis, and an axis based on an X-ray intensity as a second axis; and
a display control processor configured to execute control to display the graph generated by the graph generation processor on a display unit,
wherein:
when I is the X-ray intensity, A is a sensitivity coefficient of the dispersion element, and L is an L value representing a distance between an X-ray generation source and the dispersion element, the graph generation processor sets an axis of $(I \times A \times L)^{1/b}$ (where $b \geq 2$) as the second axis; or
when I is the X-ray intensity, A is a sensitivity coefficient of the dispersion element, and $\theta$ is a Bragg angle, the graph generation processor sets an axis of $(I \times A \times \sin\theta)^{1/b}$ (where $b \geq 2$) as the second axis.

6. An image processing method, comprising:
acquiring a plurality of spectra that respectively have different measurement energy ranges and energy resolutions and are acquired using an X-ray spectrometer having a plurality of dispersion elements with different spectral characteristics;
setting the plurality of spectra on a single graph having an axis of an $a^{th}$ root of the energy (where $a \geq 2$) as a first axis, and an axis based on an X-ray intensity as a second axis; and
displaying the graph on a display unit,
wherein:
when I is the X-ray intensity, A is a sensitivity coefficient of the dispersion element, and L is an L value representing a distance between an X-ray generation source and the dispersion element, an axis of $(I \times A \times L)^{1/b}$ (where $b \geq 2$) is set as the second axis; or
when I is the X-ray intensity, A is a sensitivity coefficient of the dispersion element, and $\theta$ is a Bragg angle, an axis of $(I \times A \times \sin\theta)^{1/b}$ (where $b \geq 2$) is set as the second axis.

* * * * *